United States Patent
Wu et al.

(10) Patent No.: US 7,276,004 B2
(45) Date of Patent: Oct. 2, 2007

(54) SLIDING CENTRIFUGAL DRIVE WEIGHTS FOR AUTOMATIC TRANSMISSION

(75) Inventors: Chun-Yi Wu, Miao-Li (TW); Pei-Hsuan Wu, Miao-Li (TW)

(73) Assignee: Union Material Co., Ltd., Miao-Li (TW)

( * ) Notice: Subject to any disclaimer, the term of this patent is extended or adjusted under 35 U.S.C. 154(b) by 0 days.

(21) Appl. No.: 11/256,368

(22) Filed: Oct. 20, 2005

(65) Prior Publication Data

US 2006/0258492 A1    Nov. 16, 2006

(30) Foreign Application Priority Data

May 11, 2005    (TW) ............................... 94115296 A

(51) Int. Cl.
*F16H 59/00*    (2006.01)
(52) U.S. Cl. ...................................................... 474/13
(58) Field of Classification Search ............ 474/13–15, 474/17, 18, 28, 46, 12
See application file for complete search history.

(56) References Cited

U.S. PATENT DOCUMENTS 6,520,878 B1 *    2/2003    Leclair et al. ................ 474/14
6,682,450 B2 *    1/2004    Mukai et al. ................. 474/15

* cited by examiner

*Primary Examiner*—Richard Ridley
*Assistant Examiner*—James Pilkington
(74) *Attorney, Agent, or Firm*—Pro-Techtor Int'l Services

(57) ABSTRACT

A sliding centrifugal drive weight for use in an automatic transmission found in motor vehicles or watercrafts. The sliding centrifugal drive weight, which mainly consists of an outer friction shell and an inner core weight, comprises an upper inclined face in sliding contact with a ramp plate, a bottom surface in sliding contact with a movable drive pulley half, a left face, and a right wear resistant face. The sliding centrifugal drive weight is designed to eliminate abnormal wear, prevent reduction gear ratio deterioration, prolong the useful life of the transmission, and have the availability to adjust reduction gear ratios as well as driving performance. At the same time, the sliding centrifugal drive weight is also adapted to compensate wear automatically, to adjust by itself to move further outward in a movable drive pulley half, make the vehicle reach a higher maximum vehicle speed.

5 Claims, 16 Drawing Sheets

| 125c.c. (GY6) | CENTRIFUGAL WEIGHT ROLLER OF PRIOR ART $\phi$ 18xH14(mm) 13gm r=9(mm) | SLIDING CENTRIFUGAL DRIVE WEIGHT OF CONFIGURATION I 13gm $d_1=d_2=d_4=9, d_3=8.3$(mm) |
|---|---|---|
| Lowest Position *(mm) | $A_R = 41$ | $A_S = 41$ |
| Revolution of Engine at Take-off (rpm) | 4480 | 4490 |
| Revolution of Clutch when Clutch Engaged (rpm) | 1720 | 1720 |
| Reduction Gear Ratio at Low Gear Status | 2.60 | 2.61 |
| Reduction Gear Ratio at High Gear Status | 0.85 | 0.77 |
| Maximum Vehicle Speed (km/hr) / Revolution of Engine (rpm) | 81.1/7800 | 85.6/7350 |
| Effective Diameter of Belt of the Drive Pulley at Maximum Vehicle Speed (mm) | 94 | 102 |

* Lowest Position represented by $A_R$ (for weight roller of prior art) or $A_S$ (for sliding drive weight) means the distance between the ramp plate and the movable drive pulley half, when the weight roller or sliding drive weight is at its lowest position (See FIG. 2 and FIG. 4) or at its low gear status.

FIG. 12

| 125c.c. (GY6) | CENTRIFUGAL WEIGHT ROLLER OF PRIOR ART $\phi$ 18xH14(mm) 13gm r=9(mm) | SLIDING CENTRIFUGAL DRIVE WEIGHT OF CONFIGURATION II 13gm $d_1=d_4=9, d_2=8.4, d_3=8$(mm) |
|---|---|---|
| Lowest Position *(mm) | $A_R = 41$ | $A_S = 40.5$ |
| Revolution of Engine at Take-off (rpm) | 5700 | 6100 |
| Revolution of Clutch when Clutch Engaged (rpm) | 2014 | 2033 |
| Reduction Gear Ratio at Low Gear Status | 2.83 | 3.00 |
| Reduction Gear Ratio at High Gear Status | 0.95 | 0.85 |
| Maximum Vehicle Speed (km/hr) / Revolution of Engine (rpm) | 87/7700 | 91.2/7230 |
| Effective Diameter of Belt of the Drive Pulley at Maximum Vehicle Speed (mm) | 96 | 104 |

* Lowest Position represented by $A_R$ (for weight roller of prior art) or $A_S$ (for sliding drive weight) means the distance between the ramp plate and the movable drive pulley half, when the weight roller or sliding drive weight is at its lowest position (See FIG. 2 and FIG. 4) or at its low gear status.

FIG. 13

| 125c.c. (GY6)<br>Model: KYMCO Jockey 125<br>Weight of driver: 55kg | CENTRIFUGAL WEIGHT ROLLER OF PRIOR ART<br>$\phi$18×H14(mm)<br>13gm<br>r=9(mm) | SLIDING CENTRIFUGAL DRIVE WEIGHT OF CONFIGURATION III<br>13gm<br>$d_1=d_3=d_4=9, d_2=10$(mm) |
|---|---|---|
| Lowest Position *(mm) | $A_R = 41$ | $A_S = 41.3$ |
| Revolution of Engine at Take-off (rpm) | 4650 | 4300 |
| Revolution of Clutch when Clutch Engaged (rpm) | 1720 | 1705 |
| Reduction Gear Ratio at Low Gear Status | 2.70 | 2.52 |
| Reduction Gear Ratio at High Gear Status | 0.87 | 0.81 |
| Maximum Vehicle Speed (km/hr) / Revolution of Engine (rpm) | 80.91/7700 | 83.4/7400 |
| Effective Diameter of Belt of the Drive Pulley at Maximum Vehicle Speed (mm) | ---- | ---- |

* Lowest Position represented by $A_R$ (for weight roller of prior art) or $A_S$ (for sliding drive weight) means the distance between the ramp plate and the movable drive pulley half, when the weight roller or sliding drive weight is at its lowest position (See FIG. 2 and FIG. 4) or at its low gear status.

FIG. 14

| 125c.c. (GY6)<br>Model: KYMCO Jockey 125<br>Weight of driver: 55kg | CENTRIFUGAL WEIGHT ROLLER OF PRIOR ART<br>$\phi$ 18xH14(mm)<br>13gm<br>r=9(mm) | SLIDING CENTRIFUGAL DRIVE WEIGHT OF CONFIGURATION IV<br>13gm<br>$d_1=d_4=9, d_2=10, d_3=8.2$(mm) |
|---|---|---|
| Lowest Position *(mm) | $A_R = 41$ | $A_S = 41.3$ |
| Revolution of Engine at Take-off (rpm) | 4600 | 4380 |
| Revolution of Clutch when Clutch Engaged (rpm) | 1710 | 1700 |
| Reduction Gear Ratio at Low Gear Status | 2.69 | 2.57 |
| Reduction Gear Ratio at High Gear Status | 0.87 | 0.79 |
| Maximum Vehicle Speed (km/hr) / Revolution of Engine (rpm) | 80.80/7800 | 85.20/7500 |
| Effective Diameter of Belt of the Drive Pulley at Maximum Vehicle Speed (mm) | ---- | ---- |

\* Lowest Position represented by $A_R$ (for weight roller of prior art) or $A_S$ (for sliding drive weight) means the distance between the ramp plate and the movable drive pulley half, when the weight roller or sliding drive weight is at its lowest position (See FIG. 2 and FIG. 4) or at its low gear status.

FIG. 15

| 150c.c.<br>Model: KYMCO, Dink 150<br>Weight of driver: 90kg | CENTRIFUGAL WEIGHT ROLLER OF PRIOR ART<br>$\phi$ 20.1xH15(mm)<br>13.5gm<br>r=10.05(mm) | SLIDING CENTRIFUGAL DRIVE WEIGHT OF CONFIGURATION V<br>13gm<br>$d_1=d_4=10.05, d_2=9.5,$<br>$d_3=9.25$(mm) |
|---|---|---|
| Lowest Position *(mm) | $A_R = 40.6$ | $A_S = 40$ |
| Effective Diameter of Belt of the Drive Pulley at Maximum Vehicle Speed (mm) | 111.8 | 115.0 |
| Maximum Vehicle Speed (km/hr) / Revolution of Engine (rpm) | 103/7900 | 106/7800 |
| Acceleration Time from 0 to 100 km/hr (sec) | 28.50 | 25.41 |

\* Lowest Position represented by $A_R$ (for weight roller of prior art) or $A_S$ (for sliding drive weight) means the distance between the ramp plate and the movable drive pulley half, when the weight roller or sliding drive weight is at its lowest position (See FIG. 2 and FIG. 4) or at its low gear status.

FIG. 16

SLIDING CENTRIFUGAL DRIVE WEIGHTS FOR AUTOMATIC TRANSMISSION

BACKGROUND OF THE INVENTION

1. Field of the Invention

The present invention relates to an automatic continuous variable transmission. More particularly, the invention relates to a centrifugal roller weight used in an automatic continuous variable transmission or the like found in motor vehicles, boats or watercrafts, or auxiliary mechanisms. Each centrifugal roller weight comprising a core weight and an outer cover made of wear-resistant resin is provided between a ramp plate and a movable drive pulley half of a drive pulley in the automatic transmission mentioned above. Upon a centrifugal force, the centrifugal roller weights move radially in the drive pulley to continuously change the width of the grooves of the drive pulley and a driven pulley while the drive pulley and driven pulley are mounted around by an endless belt, so as to change the vehicle speed continuously.

2. Description of the Prior Art

A conventional automatic continuous variable transmission (i.e., CVT) 1 of a motor vehicle is illustrated in FIG. 1 and it comprises a drive pulley 2 proximate to an engine 12, a driven pulley 3 at a rear axle, and an endless trapezoid-section belt 9 (i.e., V-belt 9) rotatably interconnected with the drive pulley 2 and the driven pulley 3. In the operation, a piston 8 is activated when the engine 12 starts. Next, a rotary shaft 10 rotates to revolve the drive pulley 2. A plurality of centrifugal weight rollers 6 (i.e., weight roller 6) in a movable drive pulley half 4 move radially outward upon a centrifugal force acting thereon. A ramp plate 7 is fixed; hence, the movable drive pulley half 4 moves toward a stationary drive pulley half 5 due to an opposite reaction, and forces exerted on sides of the V-belt 9 push the V-belt 9 of the drive pulley 2 to move outward. Thus, the effective diameter of the V-belt 9 of the drive pulley 2 increases and, at the same time, the V-belt 9 of the driven pulley 3 moves toward the rotary shaft 10 and the effective diameter of the V-belt 9 of the driven pulley 3 decreases. As the revolution of engine changes, the centrifugal force acting on the weight roller 6 is changed. Thus, the distance between the movable drive pulley half 4 and the stationary drive pulley half 5 is changed. As a result, the continuous change of effective diameters of V-belts 9 of the drive pulley 2 and the driven pulley 3 changes the speed of vehicle. Such a conventional continuous variable transmission 1 of motor vehicle is disclosed in U.S. Pat. No. 4,925,432. The shape of the weight roller 6 in the movable drive pulley half 4 is spherical (see U.S. Pat. No. 2,986,043) or cylindrical (see U.S. Pat. No. 4,925,432).

The weight roller 6 is at a lowest position in the movable drive pulley half 4 when the revolution of engine is lower than a predetermined value or centrifugal force acting on the weight roller 6 is very small (see FIG. 2). At this position, the effective diameter ($2h_{RO}$) of the V-belt 9 in the drive pulley 2 is a minimum and the effective diameter of the V-belt 9 in the driven pulley 3 is a maximum. The transmission 1 is in a low gear status when the weight roller 6 is at its lowest position (see FIG. 2).

The revolution of the drive pulley 2 is higher than that of the driven pulley 3 when the motor vehicle starts. For example, the drive pulley 2 may rotate three times while the driven pulley 3 rotates once. This means a reduction gear ratio 3:1 in low gear status, when the vehicle speed is slow but the engine has a large torque.

As the revolution of engine increases, the centrifugal force acting on the weight roller 6 increases correspondingly. While weight rollers 6 gradually move radially outward, the effective diameter of the V-belt 9 in the drive pulley 2 increases and the effective diameter of the V-belt 9 in the driven pulley 3 decreases correspondingly. This continuous changing of the effective diameter of the V-belt of the drive pulley 2 and that of the driven pulley 3 shows the continuous gearshifting of the automatic transmission.

The weight roller 6 is at a highest position in the movable drive pulley half 4 (see FIG. 3). At this position, the effective diameter ($2h_R$) of the V-belt 9 of the drive pulley 2 is a maximum and the effective diameter of the V-belt 9 of the driven pulley 3 is a minimum. The transmission 1 is in a high gear status when the weight roller 6 is at its highest position (see FIG. 3). At this position, the revolution of the drive pulley 2 is lower than that of the driven pulley 3. For example, the drive pulley 2 may rotate 0.9 times while the driven pulley 3 rotates once. This means a reduction gear ratio 0.9:1 in high gear status, when the vehicle speed is fast but the engine has a small torque.

From the mechanism of prior art, we can understand that if the sizes and angles of the drive pulley 2, the driven pulley 3, and other related parts are fixed, and sizes of weight rollers 6 are fixed, then the lowest position (see FIG. 2) and highest position (see FIG. 3) of the weight roller 6 in the movable drive pulley half 4 are fixed. Thus, reduction gear ratios of low gear status and high gear status in the transmission are unchangeably fixed. However, when the weight rollers 6 wear after a period of time of use, reduction gear ratios of low gear status and high gear status then deteriorate undesirably. This in turn adversely affects a gearshifting performance of the motor vehicle.

In the prior art it is typically to decrease weight of the weight roller 6 for increasing driving power. In this arrangement, the required revolution of the engine for a clutch 11 to engage and for the vehicle to start will increase to a value larger than the predetermined required value. Thus, the vehicle can start powerfully. However, the centrifugal force in this arrangement is therefore not large enough, and the effective diameter ($2h_R$) of the V-belt 9 of the drive pulley 2 is decreased, so the maximum vehicle speed is decreased, due to lighter weight rollers 6. On the contrary, increasing weight of the weight rollers 6 will increase the centrifugal force and decrease the required revolution of the engine for the clutch 11 to engage and start the vehicle. Thus, the vehicle starts relatively weakly. However, because of heavier weight rollers 6, the centrifugal force is larger and the effective diameter ($2h_R$) of the V-belt 9 of the drive pulley 2 is increased, and therefore the maximum vehicle speed is increased.

In the prior art it is also found that, when the weight rollers 6 are at its highest position (see FIG. 3), surfaces of the weight rollers 6 contacted with the ramp plate 7 may easily be worn or scraped due to low precision of the ramp plate 7. As those stated above, when the weight rollers 6 are worn and their sizes become smaller, the distance that the movable drive pulley half 4 can move is shorter and the effective diameter ($2h_R$) of the V-belt 9 of the drive pulley 2 is decreased. As a result, reduction gear ratios of low gear status and high gear status of the transmission will then deteriorate significantly.

From those stated above we understand that, in the said centrifugal automatic transmission, using weight rollers 6 in the movable drive pulley half 4 of the drive pulley 2 has the following disadvantages: (1) Surface of the weight roller 6 usually wear abnormally when the weight roller 6 is at its highest position (see FIG. 3). Thus, reduction gear ratios of low gear status and high gear status can deteriorate significantly. (2) Changing weight of the weight roller 6 merely cannot increase both the initial acceleration and maximum vehicle speed of the motor vehicle simultaneously. (3) If sizes and angles of the drive pulley 2 and the driven pulley 3 are retained unchanged, it is not possible to use means of weight rollers 6 to adjust reduction gear ratio of low gear status or high gear status, and it is not easy to adjust driving performance either. Thus, the need for improvement exists.

SUMMARY OF THE INVENTION

It is therefore an object of the present invention to provide an improved weight roller, which we hereby call it sliding centrifugal drive weight 60, that can not only eliminate the disadvantages of roller weight 6 of the prior art, but also increase the adjustability and performance of a centrifugal automatic transmission.

This sliding centrifugal drive weight 60 will be installed in an automatic transmission which comprises a drive pulley 2 including a movable drive pulley half 4, a stationary drive pulley half 5, and a ramp plate 7, a movable driven pulley 3, an endless V-belt 9 having one end rotatably fitted around a groove confined by the drive pulley 2 and the other end rotatably fitted around a groove confined by the driven pulley 3, and a plurality of said sliding centrifugal drive weights 60 mounted between the ramp plate 7 and the ramp 13 of the movable drive pulley half 4. In a rotational movement of the movable drive pulley half 4, each said sliding centrifugal drive weight 60 is adapted to slidingly move radially outward along the ramp 13 of the movable drive pulley half 4 upon a centrifugal force acting thereon, while the movable drive pulley half 4 moves axially toward the stationary drive pulley half 5 so as to change sizes of the grooves of the drive pulley 2 and of the driven pulley 3. Both effective diameter of the V-belt 9 of the drive pulley 2 and the driven pulley 3 is therefore changed, and thereby effecting a smooth gearshifting. Each said sliding centrifugal drive weight 60 consists of an outer friction shell 65 formed of durable self-lubricated plastics and an inner core weight 64 usually formed of metal; and said sliding centrifugal drive weight 60 comprises an upper inclined face 61 in sliding contact with the inner surface 14 of the ramp plate 7, a bottom surface 62 in sliding contact with the ramp 13 of the movable drive pulley half 4, a left face 67 (the left face being the side of the sliding centrifugal drive weight 60 which is nearest the rotary shaft 10) which is urged against a left side inner wall 16 of the movable drive pulley half 4 when said sliding centrifugal drive weight 60 is at its lowest position in the movable drive pulley half 4, and a right wear resistant face 66 which is almost not in contact with a right side inner wall 15 of the movable drive pulley half 4 when said sliding centrifugal drive weight 60 is at its highest position in the movable drive pulley half 4; that is, said sliding centrifugal drive weight is designed to have a feature of $d_2 > d_3$, and is adapted to compensate the wear automatically and to adjust by itself to move further outward and obtain a higher maximum vehicle speed. A plurality of distance parameters including $d_1$, $d_2$, $d_3$, and $d_4$ with respect to the upper inclined face 61, said bottom surface 62, said left face 67, and said right wear resistant face 66 are defined wherein $d_1$ is the distance from the center O of said sliding centrifugal drive weight 60 to the left face 67 of said sliding centrifugal drive weight 60 measured in a direction normal to the rotary shaft 10, $d_2$ is the distance from the center O of said sliding centrifugal drive weight 60 to the upper inclined face 61 of the sliding centrifugal drive weight 60 measured in a direction normal to the surface of the inclined face 61, $d_3$ is the distance from the center O of the sliding centrifugal drive weight 60 to the right wear resistant face 66 of said sliding centrifugal drive weight 60 measured in a direction normal to the rotary shaft 10, and $d_4$ is the distance from the center O of said sliding centrifugal drive weight 60 to the nearest point on the bottom surface 62 of said sliding centrifugal drive weight 60.

The above and other objects, features and advantages of the present invention will become apparent from the following detailed description along with the accompanying drawings.

BRIEF DESCRIPTION OF THE DRAWINGS

FIG. 12 is a table showing the data recorded in the CVT properties comparison of the sliding centrifugal drive weight of a first preferred configuration of the present invention and the conventional centrifugal weight roller of the prior art;

FIG. 13 is a table showing the data recorded in the CVT properties comparison of the sliding centrifugal drive weight of a second preferred configuration of the present invention and the conventional centrifugal weight roller of the prior art;

FIG. 14 is a table showing the data recorded in the CVT properties comparison of the sliding centrifugal drive weight of a third preferred configuration of the present invention and the conventional centrifugal weight roller of the prior art;

FIG. 15 is a table showing the data recorded in the CVT properties comparison of the sliding centrifugal drive weight of a fourth preferred configuration of the present invention and the conventional centrifugal weight roller of the prior art;

FIG. 16 is a table showing the data recorded in the CVT properties comparison of the sliding centrifugal drive weight of a fifth preferred configuration of the preferred invention and the conventional centrifugal weight roller of the prior art;

DETAILED DESCRIPTION OF THE INVENTION

Figure 4:
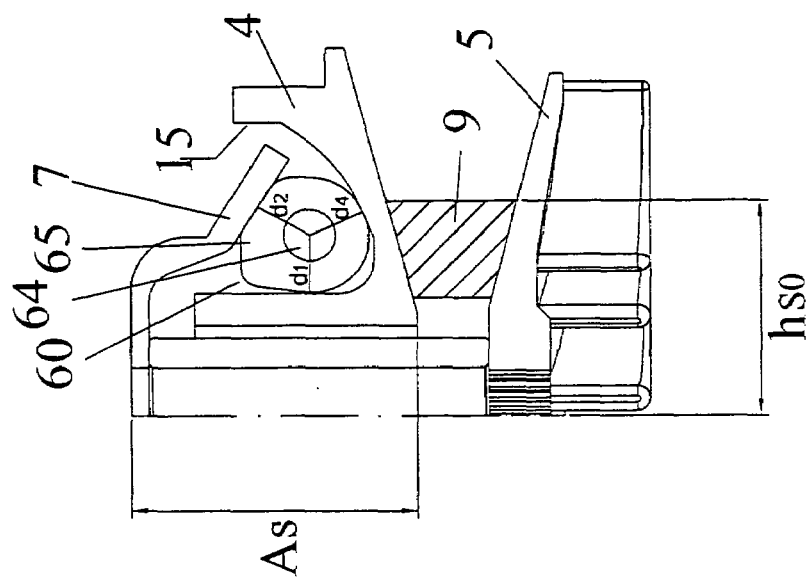
FIG. 4 is a sectional view of a portion of a movable drive pulley half wherein the sliding centrifugal drive weight, whose bottom surface is arcuate according to a first preferred embodiment of the present invention, is at its lowest position in a low gear status.
Figure 5:
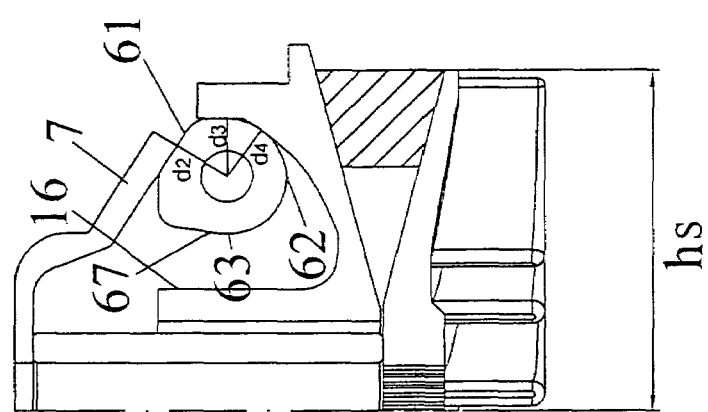
FIG. 5 is a view similar to FIG. 4 where the sliding centrifugal drive weight according to the first preferred embodiment is at its highest position in a high gear status.
Figure 6:
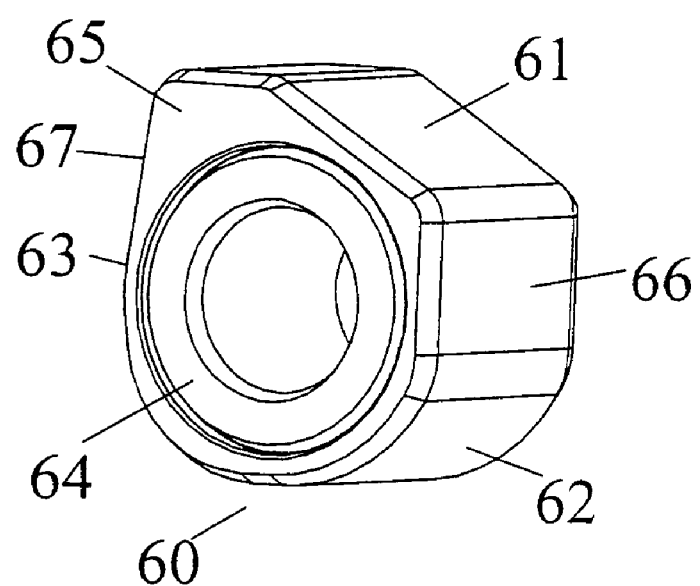
FIGS. 6 and 7 are perspective views of a sliding centrifugal drive weight according to the present invention.
Figure 7:
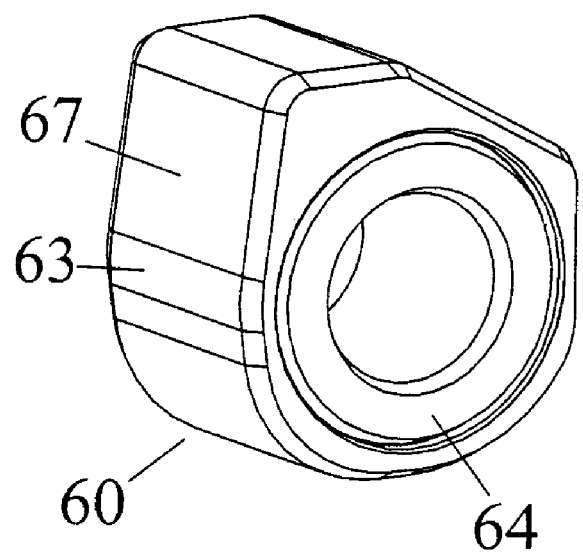
Figure 8:
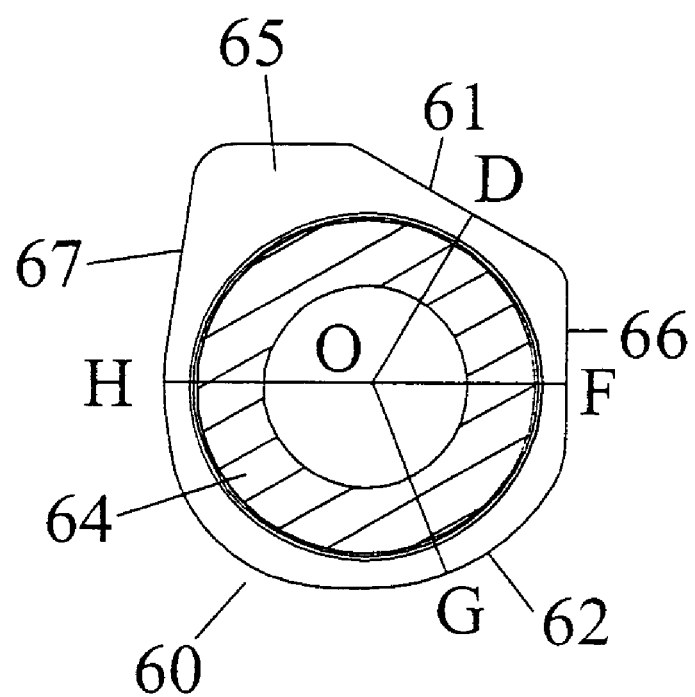
FIG. 8 is a sectional view of the sliding centrifugal drive weight shown in FIG. 6 according to the present invention.
Figure 9:
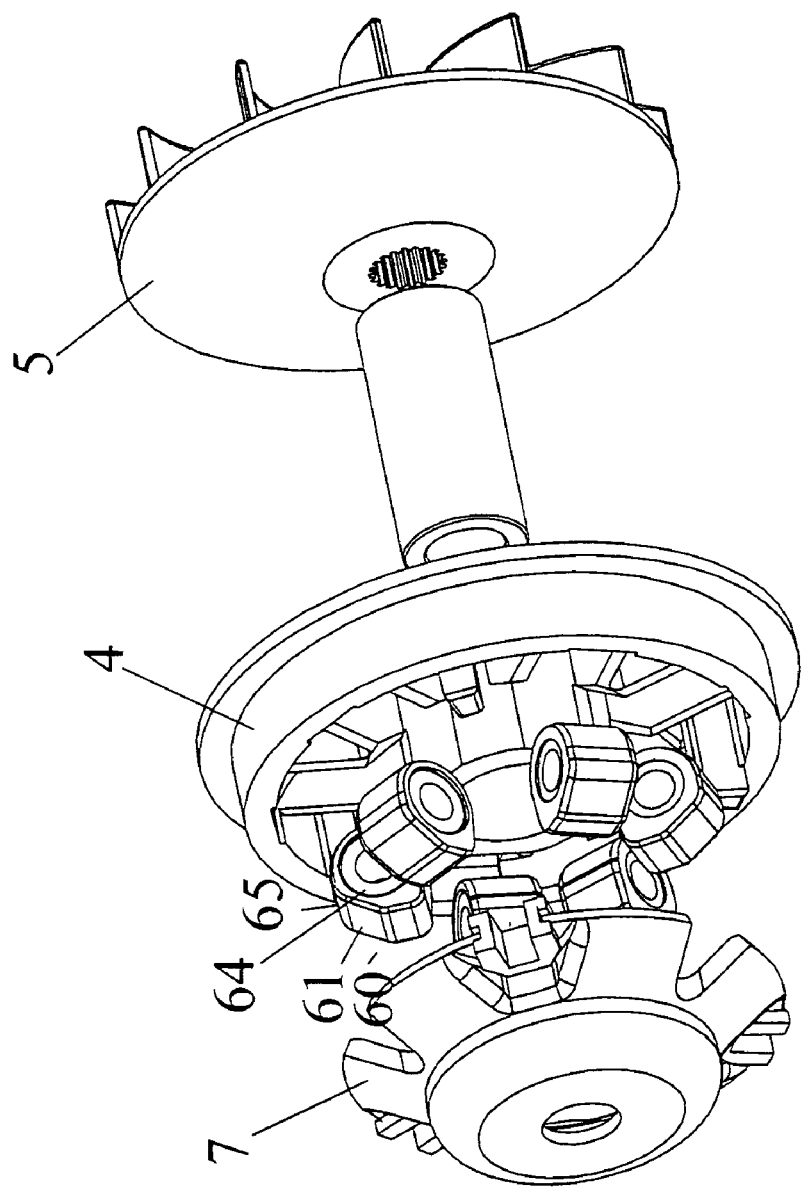
FIG. 9 is an exploded view of the automatic CVT incorporating the sliding centrifugal drive weights and the drive pulley according to the present invention.
Figure 10:
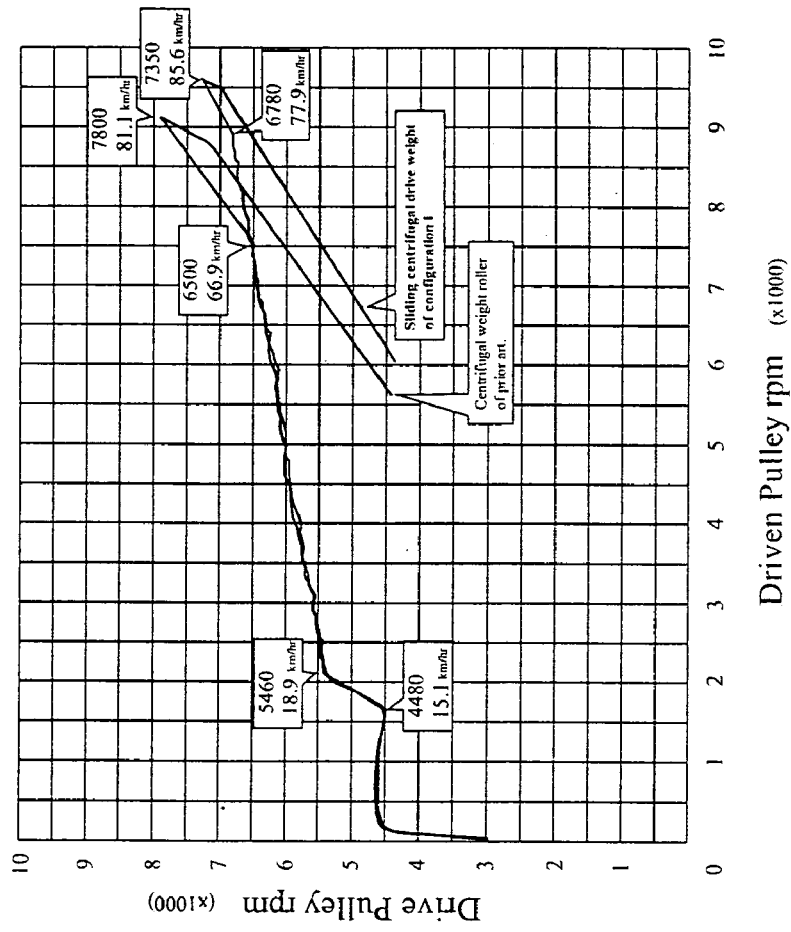
FIG. 10 is a plot of drive pulley revolutions (rpm, i.e., revolution per minute) versus driven pulley revolutions (rpm) for comparing the performance of the sliding centrifugal drive weight of a first preferred configuration of the present invention with that of the conventional centrifugal weight roller of the prior art in a CVT.
Figure 11:
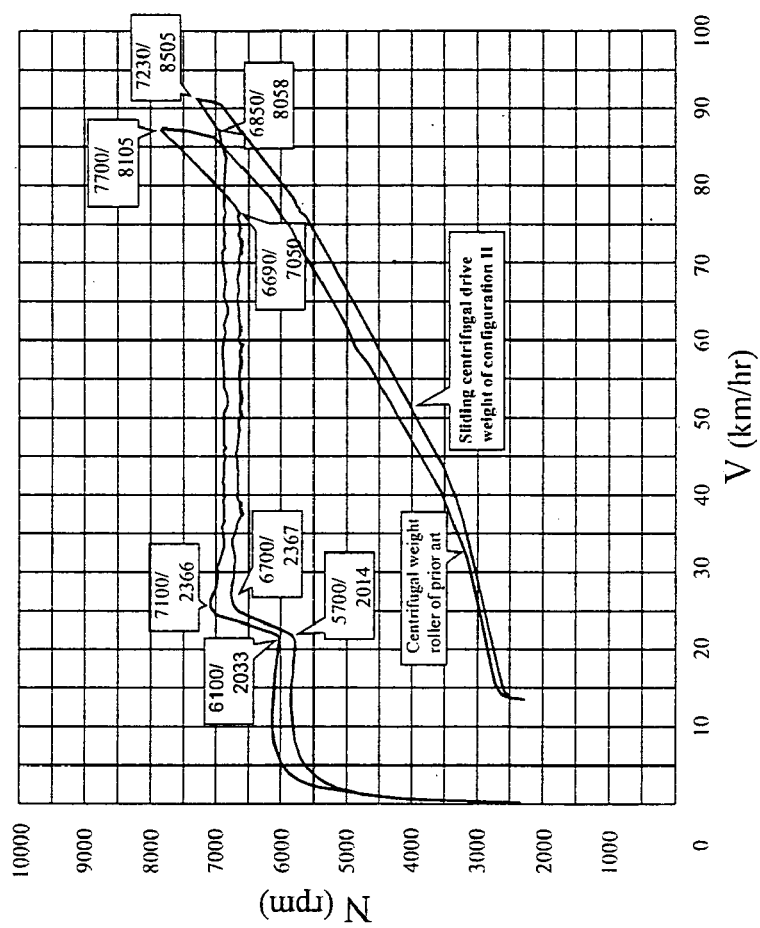
FIG. 11 is a plot of engine revolutions (rpm) versus vehicle speed (km/hr) for comparing the performance of the sliding centrifugal drive weight of a second preferred configuration of the present invention with that of the conventional centrifugal weight roller of the prior art in a full load acceleration N/V curve.

Referring to FIGS. 4, 5, 6, 7, 8, and 9, a sliding centrifugal drive weight 60 according to the present invention for automatic transmission of a motor vehicle in accordance with a first preferred embodiment of the present invention comprises an outer friction shell 65 formed of durable self-lubricated plastics and an inner core weight 64 usually formed of metal. Said sliding centrifugal drive weight 60 comprises an upper inclined face 61 in sliding contact with an inner surface 14 of a ramp plate 7, a bottom surface 62 in sliding contact with the ramp 13 of a movable drive pulley half 4, a left face 67 urged against a left side inner wall 16 of the movable drive pulley half 4 when said sliding centrifugal drive weight 60 is at its. lowest position in the movable drive pulley half 4 (FIG. 4), and a right wear resistant face 66 that almost does not contact with a right side inner wall 15 of the movable drive pulley half 4 even if said sliding centrifugal drive weight 60 is at its highest position in the movable drive pulley half 4; that is, said sliding centrifugal drive weight is designed to have a feature of $d_2 > d_3$, and is adapted to compensate the wear automatically and to adjust by itself to move further outward to obtain a higher maximum vehicle speed (FIG. 5).

Definitions of a number of distance parameters with respect to said upper inclined face 61, said bottom surface 62, said left face 67, and said right wear resistant face 66 are detailed below (FIGS. 4, 5, and 8) in which $d_1$ means a radial distance from the center point O to a point (shown as H) on a self-adjustment portion 63 of said left face 67 measured in a direction normal to the rotary shaft 10, $d_2$ means a radial distance from the center point O to a point (shown as D) on said upper inclined face 61 measured in a direction normal to the surface of the inclined face 61, $d_3$ means a radial distance from the center point O to a point (shown as F) on said right wear resistant face 66 measured in a direction normal to the rotary shaft 10, and $d_4$ means a radial distance from the center point O to a nearest point (shown as G) on said bottom surface 62.

Said sliding centrifugal drive weight 60 of the invention has a self-adjustment characteristic when $d_2 > d_3$. That is, a gearshifting performance of the transmission is not affected when said sliding centrifugal drive weight 60 according to the present invention has a minor wear (as detailed later in preferred configuration 11). Moreover, said sliding centrifugal drive weight 60 of the invention is adapted to enable said movable drive pulley half 4 to move a further out distance axially, the V-belt 9 to have a longer effective diameter ($2h_s$), and the motor vehicle to run faster (i.e., maximum vehicle speed increased).

Said sliding centrifugal drive weight 60 according to the present invention thus has a number of following advantages as compared with the conventional centrifugal weight roller 6 of prior art. (1) No abnormal wear occurs, and reduction gear ratio in a high gear status does not deteriorate when said sliding centrifugal drive weight 60 slides to a highest point (FIG. 5). (2) The size and shapes of said sliding centrifugal drive weight 60 can be specially designed, so that said sliding centrifugal drive weights 60 at a same weight can cause a motor vehicle to have both an increased acceleration when starting off, and a faster acceleration to reach a higher maximum vehicle speed. (3) Said sliding centrifugal drive weights 60 can be specially designed to adjust reduction gear ratio of low gear status and high gear status in the transmission, respectively or simultaneously, without modifying sizes or angles of the movable drive pulley half 4 and the ramp plate 7. Thus, it is easy to adjust the driving performance.

In addition, it is also found that it is not easy to obtain a precise ramp plate 7 due to punching, and thus an inclined angle of the ramp plate 7 is not always matched to that of the upper inclined face 61 (i.e., the ramp plate 7 is not aligned with the upper inclined face 61). Therefore, a self-adjustment portion 63 on said left face 67 is formed. When said sliding centrifugal drive weight 60 is placed between the movable drive pulley half 4 and the inner surface 14 of the ramp plate 7, and the self-adjustment portion 63 of said left face 67 is urged against the left side inner wall 16 of the movable drive pulley half 4, said sliding centrifugal drive weight 60 is adapted to adjust itself by pivoting about said self-adjustment portion 63 for aligning the upper inclined face 61 with the inner surface 14 of the ramp plate 7, and therefore to obtain a maximum contact area therebetween. As a result, the movable drive pulley half 4 can slide smoother.

Said sliding centrifugal drive weight 60 according to the first preferred embodiment of the present invention will be described in detail in a number of preferred configurations below by referring to FIGS. 4, 5, and 10 to 16.

Preferred Configuration I

Figure 1:
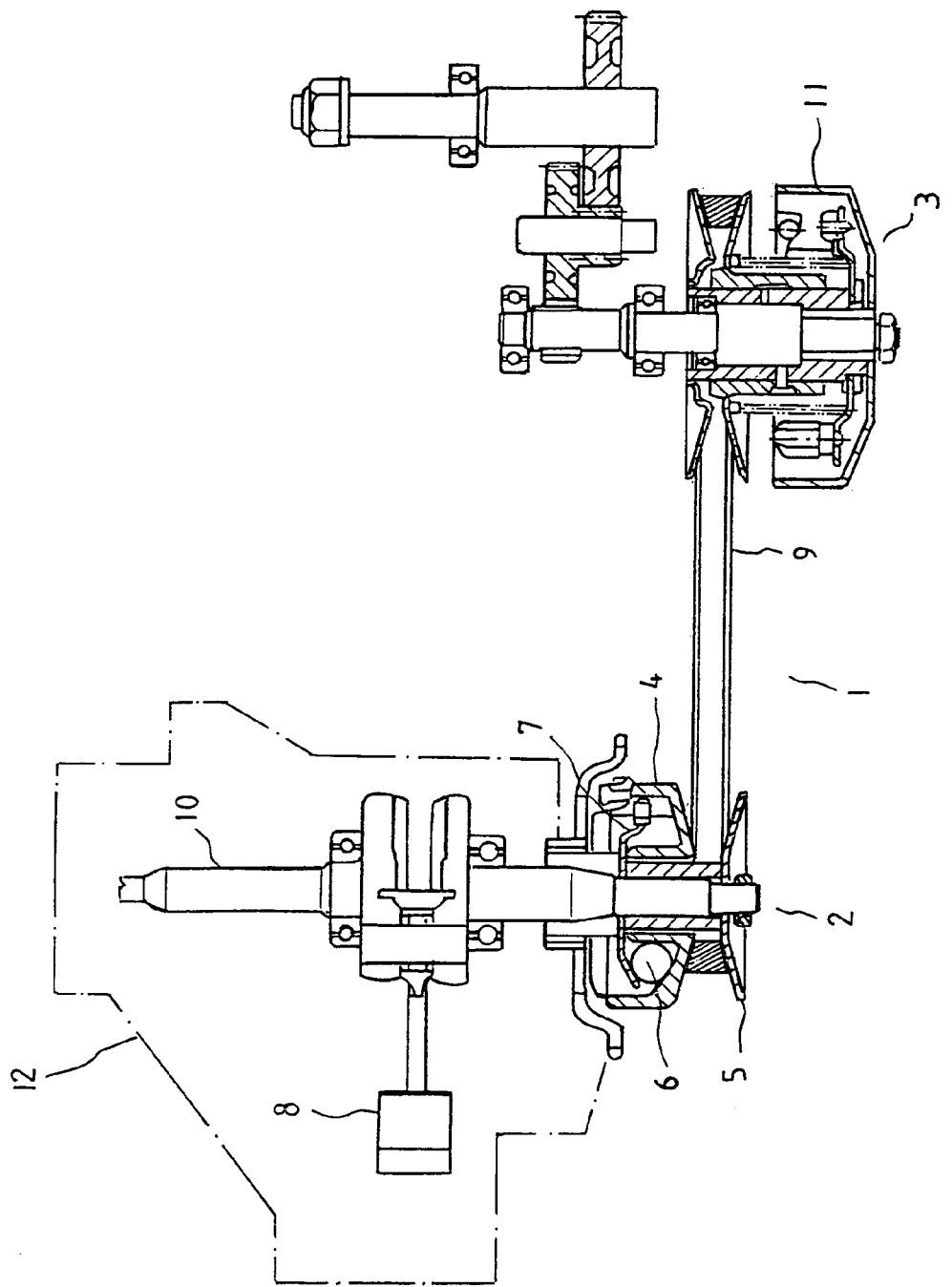
FIG. 1 is a top plan view in part section of a conventional automatic continuous variable transmission (a.k.a. CVT)
Figure 2:
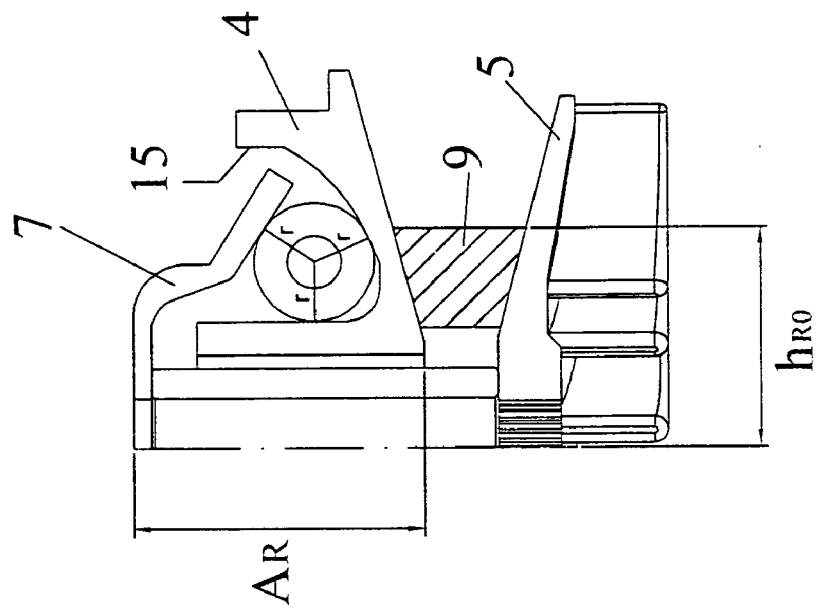
FIG. 2 is a sectional view of a portion of the movable drive pulley half shown in FIG. 1 where. the centrifugal weight roller therein is at its lowest position in a low gear status.
Figure 3:
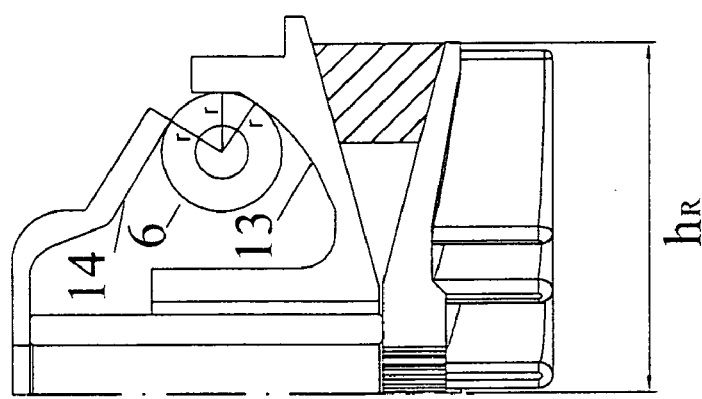
FIG. 3 is a view similar to FIG. 2 where the centrifugal weight roller is at its highest position in a high gear status.

In this configuration (see FIGS. 10 and 12), the sliding centrifugal drive weight 60's specifications are that $d_1 = d_2 = d_4 = r$ and $d_3 < r$. Said sliding centrifugal drive weight 60 is at a same lowest position in the movable drive pulley half 4 (FIG. 4) as that of the conventional centrifugal weight roller 6 of the prior art shown in FIG. 2. That is, the diameter $2h_{SO}$ of V-belt according to this preferred configuration is equal to the diameter $2h_{RO}$ of V-belt of the prior art. As the revolution of the engine increases, the centrifugal force increases to a maximum. Because of $d_3 < r$, the right wear resistant face 66 does not contact with the right side inner wall 15 of the movable drive pulley half 4, and therefore, said sliding centrifugal drive weight 60 can continue to slide further outward a distance equal to $r-d_3$. Thus, the side pressure exerted on the V-belt 9 of the drive pulley 2 is larger, and so the effective diameter of the V-belt 9 in the drive pulley 2 is larger than the effective diameter of the V-belt when using conventional centrifugal weight roller 6 of the prior art; that is, $2h_S$ in FIG. 5 is larger than $2h_R$ in FIG. 3. By utilizing the sliding centrifugal drive weight 60 according to this preferred configuration, a motor vehicle can have a same initial acceleration, but reach a higher maximum vehicle speed while the revolution of the engine at the maximum vehicle speed is rather lower (see FIGS. 10 and 12); that is, more fuel-saving.

Both the sliding centrifugal drive weight 60 according to this preferred configuration and the conventional centrifugal weight roller 6 of the prior art provide a same reduction gear ratio (2.60 as shown in FIG. 12) in low gear status, but the reduction gear ratio in high gear status changes (from 0.85 to 0.77 as shown in FIG. 12) when using the sliding centrifugal drive weight 60 according to this preferred configuration. That is, a higher maximum vehicle speed is obtained at a rather lower revolution of the engine.

Preferred Configuration II

In this configuration (see FIGS. 11 and 13), the sliding centrifugal drive weight 60's specifications are that $d_1=d_4=r$, $d_2<r$, and $d_3<r$. The lowest position (low gear status, FIG. 4) of said sliding centrifugal drive weight 60 this preferred configuration is lower than that of the conventional weight roller 6 shown in FIG. 2; that is, $2h_{SO}$ in FIG. 4 is smaller than $2h_{RO}$ in FIG. 2. Thus, a higher revolution of the engine is required for a motor vehicle to start off, and a higher revolution of the engine means the initial torque is larger than that of the conventional centrifugal weight roller 6 of the prior art. Also, because of $d_3<r$, diameter $2h_S$ in FIG. 5 is longer than diameter $2h_R$ in FIG. 3. Therefore, by utilizing the sliding centrifugal drive weight 60 according to this preferred configuration, a motor vehicle can extend its reduction gear ratio range (from a range of 2.83~0.95 to a range of 3.00~0.85, as shown in FIG. 13). That is, the start-off is more powerful, and the maximum vehicle speed is higher while more fuel-saving (see FIGS. 11 and 13). In this preferred configuration, it is also found that even though the sliding centrifugal drive weight 60 may wear after a period of time (i.e., $A_R > A_S$ as shown in FIG. 13), the sliding centrifugal drive weight 60 can adjust itself automatically, and therefore the maximum effective diameter of the V-belt will not be changed, and the performance of the motor vehicle in high speed will not be adversely affected.

Preferred Configuration III

In this configuration (see. FIG. 14), the sliding centrifugal drive weight 60's specifications are that $d_1=d_3=d_4=r$ and $d_2>r$. It is found that $2h_{SO}$ in FIG. 4 is larger than $2h_{RO}$ in FIG. 2 by comparing said sliding centrifugal drive weight 60 according to the present invention with the conventional centrifugal weight roller 6 of the prior art. That is, a motor vehicle can start off at a lower revolution of the engine. Also, because of $d_2>r$, an effective diameter of V-belt in the drive pulley 2 is increased and the maximum vehicle speed is higher when said sliding centrifugal drive weight 60 slides to its highest position (see FIG. 14). By utilizing the sliding centrifugal drive weight 60 according to this preferred configuration, a motor vehicle can reduce its reduction gear ratio of low gear status (from 2.7 to 2.52, as shown in FIG. 14); that is, start-off is smoother. Further, reduction gear ratio of high gear status can also be reduced (from 0.87 to 0.81, as shown in FIG. 14) so the maximum vehicle speed is higher and the motor vehicle is more fuel-saving.

Preferred Configuration IV

In this configuration (see FIG. 15), the sliding centrifugal drive weight 60's specifications are that $d_1=d_4=r$, $d_2>r$, and $d_3<r$. By comparing said sliding centrifugal drive weight 60 according to the present invention with the conventional centrifugal weight roller 6 of the prior art, it is found that $h_{SO}$ in FIG. 4 is larger than $h_{RO}$ in FIG. 2; that is, a motor vehicle can start off at a lower revolution of the engine; i.e., the start-off is smoother. In addition, by comparing FIG. 5 with FIG. 3, it is also found that the sliding centrifugal drive weight 60 according to the present invention moves a distance longer than that the conventional centrifugal weight roller 6 of the prior art does, by a value of $r-d_3$. Thus, the effective diameter of the V-belt in the drive pulley 2 is increased; i.e., $2h_S$ in FIG. 5 is larger than $2h_R$ in FIG. 3. As a result, the motor vehicle has a higher maximum vehicle speed (see FIG. 15). By utilizing said sliding centrifugal drive weight 60 according to this preferred configuration, a motor vehicle can change its reduction gear ratio range (from a range of 2.69~0.87 to a range of 2.57~0.79, as shown in FIG. 15); and this means the start-off is smoother, the revolution of the engine at start-off is lower, and the maximum vehicle speed is higher while more fuel-saving.

Preferred Configuration V

In this configuration (see FIG. 16), the sliding centrifugal drive weight 60's specifications are that $d_1=d_4=r$, $d_2<r$, and $d_3<r$. By comparing FIG. 4 with FIG. 2, $h_{SO}$ of this preferred configuration is smaller; while by comparing FIG. 5 with FIG. 3, $h_S$ according to this configuration is larger. Thus, by utilizing the sliding centrifugal drive weight 60 according to this configuration, a higher revolution of the engine is required for a motor vehicle to start off, and this means the torque at start-off is larger and the acceleration to a higher maximum vehicle speed is faster. For example, the acceleration time from 0 km to 100 km is decreased from 28.50 second to 25.41 second (see FIG. 16).

Figure 17:
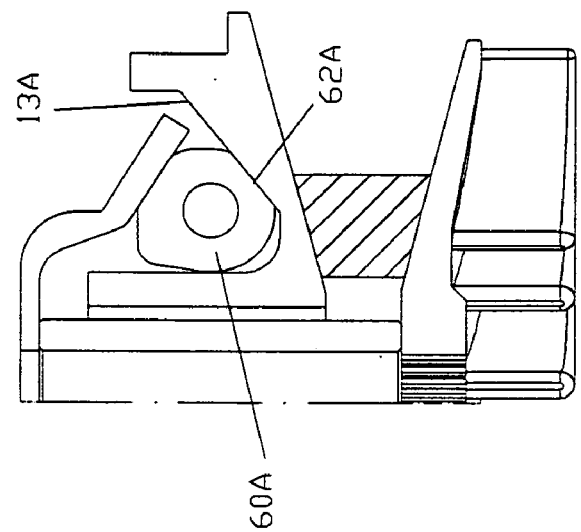
FIG. 17 is a sectional view of a portion of a movable drive pulley wherein the sliding centrifugal drive weight, whose bottom surface has an inclined flat surface according to a second preferred embodiment of the present invention, is at its lowest position in a low gear status.
Figure 18:
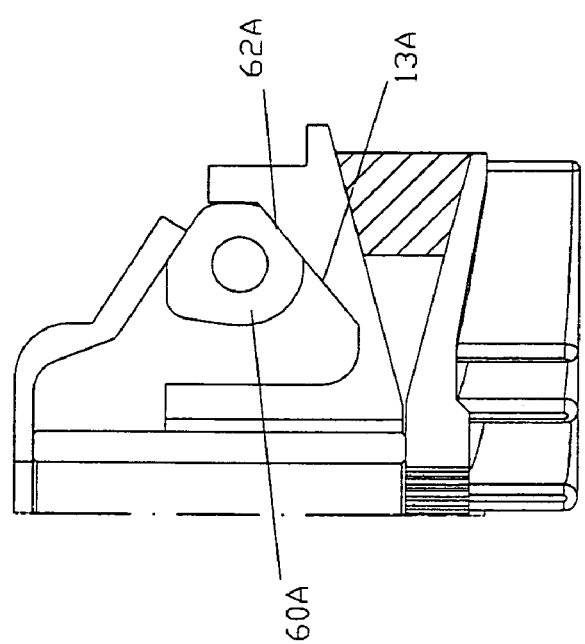
FIG. 18 is a view similar to FIG. 17 where the sliding centrifugal drive weight is at its highest position in a high gear status.

According to the discussion of the preferred configurations, it is concluded that said sliding centrifugal drive weight 60 according to the present invention has many advantages that the conventional centrifugal weight roller 6 of the prior art does not have. Referring to FIGS. 17 and 18, the ramp of a movable drive pulley half 4 may be an inclined plane surface (i.e., ramp 13A), and therefore according to a second embodiment of the present invention, the relevant bottom surface can be an inclined flat surface (i.e., bottom surface 62A). Hence, the purposes of prolonging the useful life of said sliding centrifugal drive weight 60A, making the gearshifting smoother, and increasing maximum vehicle speed can all be achieved.

Figure 19:
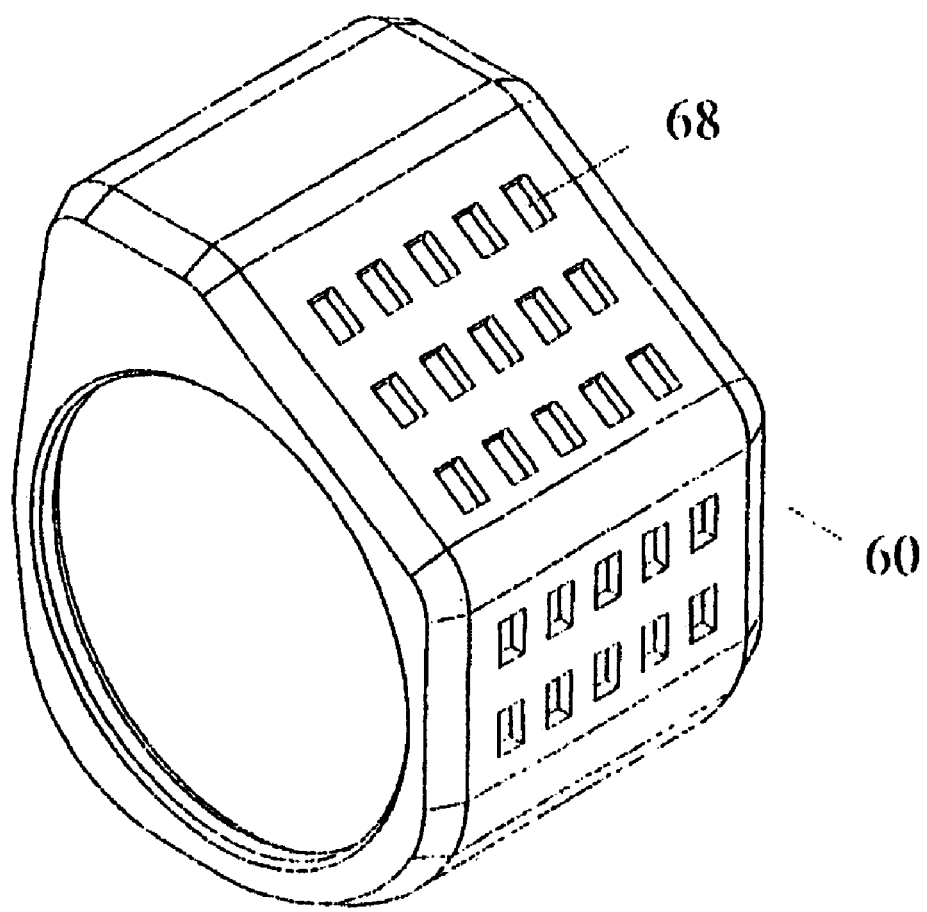
FIG. 19 is a perspective view of a sliding centrifugal drive weight according to a third preferred embodiment of the present invention where one or a plurality of oil recesses are formed on its outer friction shell.

Referring to FIG. 19, a sliding centrifugal drive weight 60 according to a third preferred embodiment of the present invention is illustrated, where one or a plurality of oil recesses 68 are formed on the outer friction shell for said sliding centrifugal drive weight 60 to further decrease the friction force and increase the agility during sliding movement..

While the invention herein disclosed has been described by means of specific embodiments and configurations, numerous modifications and variations could be made thereto by those skilled in the art without departing from the scope and spirit of the invention set forth in the claims.

What is claimed is:

1. A sliding centrifugal drive weight for use in an automatic continuous variable transmission which has a rotary shaft with a drive pulley including a movable drive pulley half, a ramp plate and a stationary drive pulley half, a driven pulley, an endless V-belt having one end rotatably fitted around a groove confined by the drive pulley and the other end rotatably fitted around a groove confined by the driven pulley, and a plurality of centrifugal drive weights mounted between the ramp plate and ramps of the movable drive pulley half ,whereby in a rotational movement of the drive pulley, the centrifugal drive weights are adapted to move radially outward along the ramp of the movable drive pulley half upon a centrifugal force acting thereon while the movable drive pulley half moves axially toward the stationary drive pulley half so as to change sizes of the grooves of the drive pulley and the driven pulley and an effective diameter of the V-belt in each of the drive pulley and the driven pulley is changed, thereby effecting a gearshifting;

said sliding centrifugal drive weight comprising a center point;

an inner core weight formed of metal; and an outer friction shell formed of durable self-lubricated plastics having an outer surface with an upper inclined face having a distance $d_2$ from said center point, measured in a direction normal to said inclined face, and being in sliding contact with an inner surface of the ramp plate, a bottom surface having a distance $d_4$ from said center point and being in sliding contact with the ramp of the movable drive pulley half, a left face, being the nearest surface of said sliding centrifugal drive weight to the axis of rotation of the rotary shaft, having a distance $d_1$ from said center point, measured in a direction normal to said rotary shaft, and being urged against a left side inner wall of the movable drive pulley half when said sliding centrifugal drive weight is at its lowest position in the movable drive pulley half, and a right wear resistant face having a distance $d_3$ from said center point, measured in a direction normal to said rotary shaft, and approaching a right side inner wall of the movable drive pulley half when said sliding centrifugal drive weight is at its highest position in the movable drive pulley half;

wherein $d_2>d_3$ such that said sliding centrifugal drive weight is adapted to compensate for wear automatically and to adjust by itself to move further radially outward to obtain a higher maximum vehicle speed.

2. The sliding centrifugal drive weight according to claim 1, wherein said left face of said sliding centrifugal drive weight comprises a self-adjustment pivot portion.

3. The sliding centrifugal drive weight according to claim 1, wherein said bottom surface of said sliding centrifugal drive weight is arcuate.

4. The sliding centrifugal drive weight according to claim 1, wherein said bottom surface of said sliding centrifugal drive weight has an inclined flat surface.

5. An automatic continuous variable transmission with sliding centrifugal drive weights, comprising:

a drive pulley including a movable drive pulley half, a ramp plate, and a stationary drive pulley half;

a driven pulley;

an endless V-belt having one end rotatably fitted around a groove confined by the drive pulley and the other end rotatably fitted around a groove confined by the driven pulley; and a plurality of centrifugal drive weights mounted between the ramp plate and ramps of the movable drive pulley half, each of said sliding centrifugal drive weights further comprising an inner core weight formed of metal having a center point, and an outer friction shell formed of durable self-lubricated plastics having an outer surface with an upper inclined face having a distance $d_2$ from said center point, measured in a direction normal to said upper inclined face, and being in sliding contact with an inner surface of the ramp plate, a bottom surface having a distance $d_4$ from said center and being in sliding contact with the ramp of the movable drive pulley half, a left face, being the nearest surface of said sliding centrifugal drive weight to the axis of rotation of the rotary shaft, having a distance $d_1$ from said center point, measured in a direction normal to said rotary shaft, and being urged against a left side inner wall of the movable drive pulley half when said sliding centrifugal drive weight is at its lowest position in the movable drive pulley half, and a right wear resistant face having a distance $d_3$ from said center point, measured in a direction normal to said rotary shaft, and approaching a right side inner wall of the movable drive pulley half when said sliding centrifugal drive weight is at its highest position in the movable drive pulley half;

wherein in a rotational movement of the drive pulley, said sliding centrifugal drive weights are adapted to move radially outward along the ramp of the movable drive pulley half upon a centrifugal force acting thereon while the movable drive pulley half moves axially toward the stationary drive pulley half so as to change sizes of the grooves of the drive pulley and the driven pulley and an effective diameter of the V-belt in each of the drive pulley and the driven pulley is changed, thereby effecting a gearshifting; and wherein $d_2>d_3$ such that said sliding centrifugal drive weight is adapted to compensate for wear automatically and to adjust by itself to move further radially outward to obtain a higher maximum vehicle speed.

* * * * *